United States Patent [19]
Heller et al.

[11] 3,887,666
[45] June 3, 1975

[54] COOLING SYSTEM

[75] Inventors: Laszlo Heller; Laszlo Forgo; Janos Bodas; Istvan Papp, all of Budapest, Hungary; G. Sz. Agejev; I. A. Alekszejev, both of Moscow, U.S.S.R.

[73] Assignee: Transelektro Magyar Villamossagi Kulkereskedelmi Vallalat, Budapest, Hungary

[22] Filed: June 29, 1973

[21] Appl. No.: 375,281

[30] Foreign Application Priority Data
July 3, 1972 Hungary............................. EE2041

[52] U.S. Cl. .................... 261/130; 62/305; 62/310; 165/138; 261/131; 261/151; 261/153; 261/155; 261/27; 261/67; 261/DIG. 11; 261/DIG. 77
[51] Int. Cl. ............................................ F28c 1/00
[58] Field of Search....... 261/DIG. 77, DIG. 11, 130, 261/131, 151, 153, 155, 27, 67; 62/305, 310; 165/138

[56] References Cited
UNITED STATES PATENTS

| | | | |
|---|---|---|---|
| 890,332 | 6/1908 | Burhorn................... | 261/DIG. 11 X |
| 1,490,254 | 4/1924 | Burhorn................... | 261/DIG. 11 X |
| 1,866,193 | 7/1932 | Coutant............................... | 261/130 |
| 2,220,219 | 11/1940 | Crawford....................... | 261/151 X |
| 3,775,993 | 12/1973 | Murphy..................... | 261/DIG. 11 X |
| 3,802,675 | 4/1974 | Cates et al............... | 261/DIG. 11 X |

Primary Examiner—Frank W. Lutter
Assistant Examiner—William Cuchlinski, Jr.
Attorney, Agent, or Firm—Blum, Moscovitz, Friedman & Kaplan

[57] ABSTRACT

An essentially vertical heat-transfer means in a cooling tower has associated therewith nozzles for spraying water on the exterior surfaces thereof. The nozzles are arranged at a plurality of levels and the nozzles at each level are controlled by a separate valve. Control means are provided so that the water nozzles can be brought into use in upward ascending sequence as the heat load on the system is increased, and vice versa. When the topmost part of the heat transfer means functions by air-cooling only, the air transported through the top portion of the heat transfer means clings to the interior surface of the cooling tower. Consequently, this air which is relatively dry does not tend to corrode the interior of the tower, making it possible to construct the tower of steel.

9 Claims, 5 Drawing Figures

COOLING SYSTEM

BACKGROUND OF THE INVENTION

As is known, two types of cooling system are used at present for cooling in power stations and industrial plants. One type of system comprises wet coolers, i.e., heat-transfer means wherein cooling is carried out by using cooling water. The other type of system comprises air coolers wherein cooling is carried out by atmospheric air. Wet coolers are used where cooling water is available at an economically viable cost. However, in areas where cooling water is not readily available or the provision thereof would be too expensive, air coolers are used.

The two types of known cooling system described above represent two extremes. In a considerable part of regions of advanced industry, climatic conditions prevail wherein at a certain time of the year too little water is available whilst at other times there is an abundance of water. These regions are, in particualr, regions having a temperate climate, where in the course of a long cold winter the tributaries of the streams or the streams themselves freeze so that the flow of water in winter is very low. However, after the thaw sufficient water is available. Thus, cooling systems comprising coolers which can function as wet coolers and as dry coolers are advantageously used in such regions. In winter the coolers work without water as pure air coolers whilst in summer the coolers can be operated in dependence on the weather conditions partly as air coolers and partly as wet coolers.

Cooling systems of the aforementioned kind can be constructed in various ways from air coolers and wet coolers. A known system of this kind comprises an air condensation plant (dry cooling plant) with heat exchangers operating in the closed system and whose surfaces on the side of the air can be wetted with cooling water. This known system has a good cooling effect and an economical construction. In winter the heat exchangers operate in the conventional manner of air coolers whilst in summer, when suitable amounts of water are available the heat exchangers can be operated as spray coolers by switching on an open secondary water circuit and by wetting the outer surfaces of the heat exchanger. Since the heat exchangers can be adapted to winter conditions when the air temperature is low the dimensions of an associated cooling tower turn out to be correspondingly small. With corresponding wetting this surface ensures a sufficient cooling action even at summer temperatures.

The cooling systems are generally dimensioned so that even a high temperatures and with a high moisture content in the cooling air a suitable cooling action is achieved. If the air temperature or moisture content is low or the amount of heat to be removed decreases then the cooling capacity of the cooling system works partly as an air cooler and partly as a wet cooler and it is expedient to effect the reduction of the cooling capacity by reducing vaporization. In this way the water consumption of the cooling system is also reduced. Evaporation of water introduces a problem in that the cooling towers associated with the cooling systems are of late being constructed as steel structures since this kind of construction has proved the most economical. In cooling towers having purely air-cooled coolers corrosion of the steel construction can be completely avoided if their parts lie within the lining of the cooling tower because they then only come into contact with dry warm air. However, in cooling towers which use water-spray cooling only or combined cooling, air with a high moisture content passes into the interior of the tower on spraying the outer surfaces of the cooler. As a result, corrosion of the steel takes place. It should be noted tha this applies whether the cooling tower operates by natural draft or air is propelled therethrough by means of fans.

SUMMARY OF THE INVENTION

In order to minimize corrosion of steel in a cooling tower the heat transfer means which is essentially vertical is fitted with spray nozzles at a plurality of levels and control means so that only the requisite quantity of water is used for cooling, the remaining load being carried by part of the heat-transfer means using air-cooling.

Control means are provided in the form of valves and preferably control thermostats so arranged that as the load increases, the bottom portion of the heat-transfer means is the first portion to be water-cooled. As the load increases further successive sections moving upwardly are sprayed with water. Where th top portion of the heat-transfer means operates by air-cooling and is not subjected to water-spray, the air passing therethrough clings to the interior surface of the cooling tower, and since this portion of the air is warm and dry, corrosion of the interior of the cooling tower is prevented.

In a preferred form of the invention, no nozzles are provided for spraying the top portion of the heat-transfer means so that a flow of dry, warm air next to the interior of the steel cooling tower is ensured.

Accordingly, an object of the present invention is to provide an improved cooler for use with a cooling tower wherein the fraction of the cooler sprayed with cooling water is adjustable to conform to the load.

Another object of the present invention is to provide an improved cooler wherein the top section of said cooler is air-cooled rather than water-cooled as a means of preventing corrosion of said cooling tower.

A further object of the present invention is to provide an improved cooler suitable for use with a cooling tower of steel.

An important object of the present invention is to provide an improved cooler wherein portions of the cooler are brought into use sequentially from the bottom and are taken out of operation in downward sequence.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
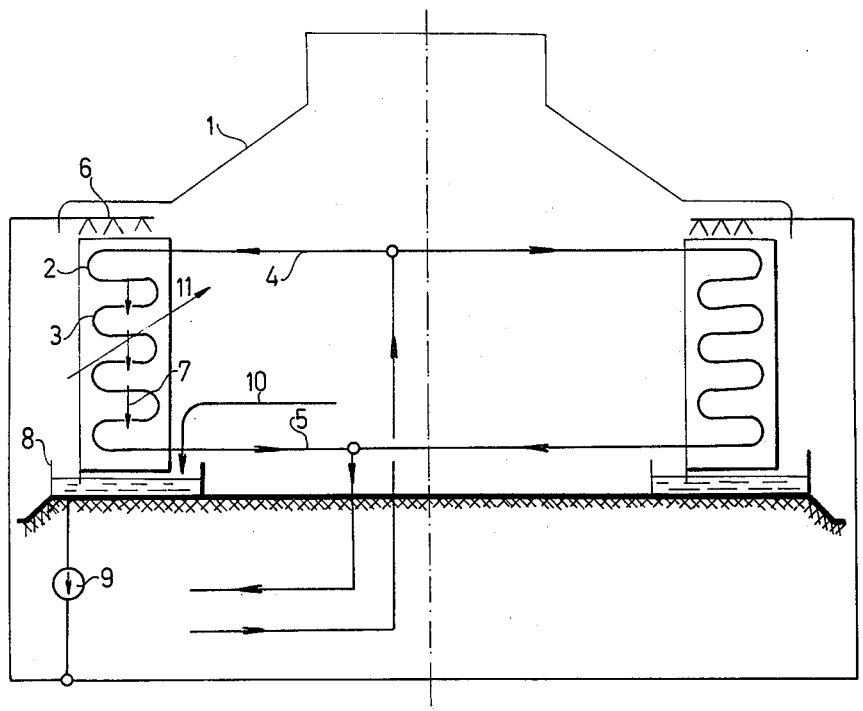
FIG. 1 is a cooling tower in which the heat-transfer means is cooled by a water spray applied in the conventional manner at the top of same.

The invention is concerned with providing a cooling system wherein only as much water is evaporated as is necessary for cooling and wherein the corrosion of the cooling towers having steel construction is avoided where possible. The problem consists in making the ratio between air cooling and spray cooling controllable and thereby guaranteeing that that portion of air drawn in for air cooling flows along the inner surface of the cooling tower associated with the cooling system. This is achieved according to the invention in that coolers are used to which water cooling can be supplied at various levels. If cooling water is supplied at all levels then the cooling system operates as a conventional spray cooler. If on the other hand all water supply points are closed then a dry cooling system is obtained. Desired combinations of the two kinds can be achieved by partially spraying the cooler. Thus the invention relates to a cooling system for the selective re-cooling of a fluid medium flowing through the cooler by air and cooling water in controlled ratio. The invention itself consists in that nozzles are manifolded for spraying the coolers with cooling water and are provided at each level with their own closure members or valve means so that the nozzles can be switched off in succession in a downwardly aligned sequence or can be switched on in succession in an upwardly aligned sequence. Through these sequences of switching on and off it is achieved that the uppermost section of the coolers begins to operate as an air cooler so that the inner side of a connected cooling tower is covered by dry air whereby, as indicated, corrosion of the steel construction of the cooling tower can be essentially prevented.

If the uppermost nozzles provided are lower than the uppermost section of the coolers then this section will remain dry during operation even when switching on all nozzles whereby the prevention of the said corrosion is guaranteed even during an entirely wet operation. It has been found expedient that the uppermost nozzles are lower than the tops of the coolers by about a quarter of the overall height of the latter. According to experiments formation of the protective air layer adjacent the interior surface of the tower is then automatically ensured.

The control of the cooling system can be carried out automatically. For this purpose a thermostat may be provided in the return or outlet line of the coolers and is connected to the closure members of the atomizer nozzles so that when the temperature of the re-cooled water increases the closure members are closed stepwise in succession in the downwardly aligned sequence whilst when the temperature drops they are opened in the reverse sequence.

Several pumps may be provided for supplying the cooling water to the nozzles, each pump being associated to another level of the nozzles so that when switching off one pump the supply of water to the nozzles associated therewith also ceases. In such an arrangement the automatic control can be achieved by acting on the pump drives.

In a conventional cooling tower as shown in FIG. 1 air coolers 2 with finned tubes 3 are mounted in a known way at the perimeter of a cooling tower 1. A flow medium to be cooled down or condensed is supplied to the tubes 3 by means of a pipe 4. The flow medium cooled down or condensed in the finned tubes 3 leaves the coolers through a return pipe 5. The outer surfaces of the coolers 2 can be sprayed with water through atomizer nozzles 6, the sprayed water running down the cooling flanges in the direction of arrow 7 and a part thereof being evaporated. The remaining water collects in a container 8 beneath the coolers 2 and is returned to the atomizer nozzles 6 by means of a pump 9. The water evaporated is replaced by water supplied through a pipeline 10.

Cooling air flows diagonally upwardly past the cooling flanges, as indicated by arrow 11. The cooling air is heated by contact with the wet cooling flanges as it removes heat from the medium flowing in the cooler and its moisture content increases. The air entering the inside of the cooling tower 1 after passing across the heat-transfer means 2 is at a higher temperature and has a higher moisture content than the atmospheric air surrounding the cooling tower so that its specific gravity is less than that of the surrounding air. This specific gravity difference causes a differential pressure between the outer side and inner side of the cooling tower whereby a constant air flow through the interior of the cooling tower ensues.

In this known cooling system a cooling tower with draught has been used although it would however also be possible to use this kind of cooling in plants wherein the air flow is effected for example by means of a blower.

Figure 2:
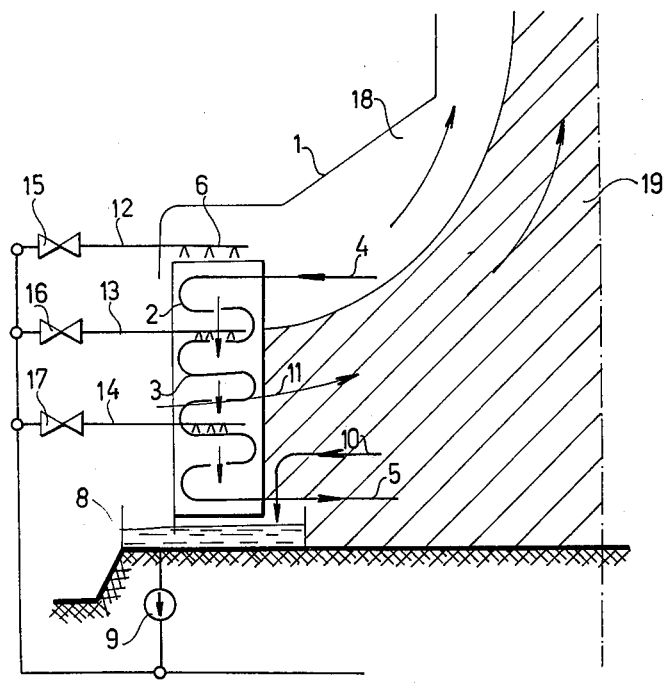
FIG. 2 is a cooling tower in accordance with the present invention.

A cooling system according to the invention is shown in FIG. 2. This cooling system has features in common with that shown in FIG. 1 but, as is apparent form FIG. 2, the atomizer nozzles are mounted here at three different levels rather than at the top of the cooler alone. Thus, the water conveyed from the collecting container 8 by means of pump 9 is sprayed on to the outer surface of coolers 2 at three different levels. The nozzles at each level are connected to distributor tubes 12, 13 and 14 respectively. Each distributor tube is provided with closure members or valve means 15, 16 or 17, by means of which each can be opened or closed individually independently of the other tubes.

The cooling system shown in FIG. 2 operates as follows:

If maximum cooling capacity is required then all three valve means 15, 16 and 17 are opened. Thus the entire surfaces of the coolers 2 are wetted. If the heat load requirement is reduced then the valve 15 is first closed. The highest section of the coolers 2 between the distributor tubes 12 and 13 thereby remains dry and operates as an air cooler. In the section below the distributor tube 13 the upper surfaces of the coolers are wetted so that heat is also removed by evaporation. In order to achieve a further reduction of the cooling capacity, the closure member 16 is also closed. Thus a stepped reduction of the wetted surface of the coolers is achieved. Finally, the closure member 17 may also be closed whereupon wetting of the outer surfaces of the coolers 2 is completely discontinued and the coolers 2 operate purely as air coolers.

FIG. 2 illustrates the situation where the uppermost valve 15 is closed so that the uppermost section of the cooler 2 operates merely as an air cooler. It is also apparent that the air flowing towards the cooling tower 1 forms two essentially separate streams. One stream 18 has a lower moisture content and a higher temperature than that of stream 19.

Stream 19 consists of an inner core with a high moisture content; its temperature exceeds the atmospheric temperature but is lower than the temperature of stream 18. Experimentally, it has been found that there is very little mixing between the two streams so that stream 18 which flows immediately over the inner surface of the cooling tower remains unmixed with stream 19 which has a much higher moisture content. This may be due to the fact that the temperature of the stream 18 is higher and its density consequently lower than the corresponding values of stream 19. Also, it is possible that the absence of mixing of the two streams is due to the fact that the Reynolds number for flow through the tower is below 2100 and is therefore laminar. In this way the construction components of the cooling tower 1 in the operating conditions described are effectively protected against corrosion caused by wet air. Furthermore, only the amount of water necessary for ensuring the cooling capacity is evaporated.

Figure 3:
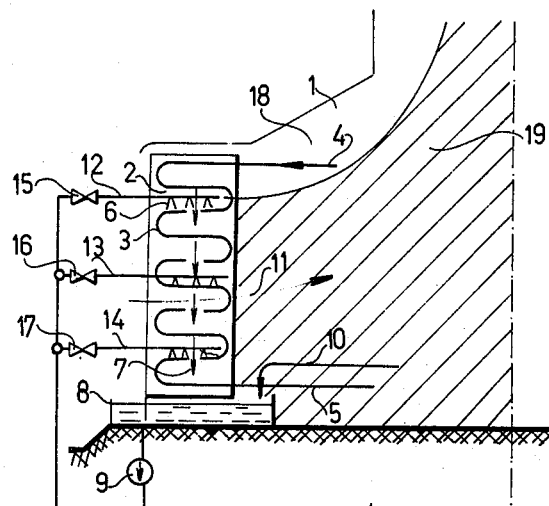
FIG. 3 is another embodiment of the present invention in which the top portion of the heat-transfer means is not fitted with spray nozzles.

The cooling system shown in FIG. 3 differs from those above in that the highest row of atomizer nozzles lies beneath the top of the cooler 2. Thus, the uppermost section of the cooler 2 remains dry during operation even when the uppermost atomizer nozzles 6 are switched on. This has the result that within the cooling tower 1 the protective air stream 18 is formed under any operating conditions. The reduction of the cooling capacity of the cooling system takes place here by switching off the groups of atomizer nozzles 6 in a downwardly aligned sequence.

Figure 4:
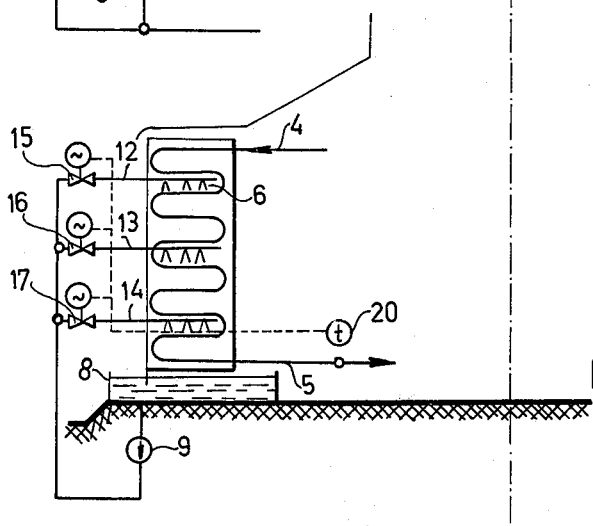
FIG. 4 is a further embodiment of the present invention wherein a thermostat is employed to control valves supplying water to spray nozzles at a plurality of levels.

In the cooling system shown in FIG. 4 the temperature of the flow medium leaving the cooling system through tube 5 is kept within defined limits. For this purpose, a thermostat 20 is provided in the return or outlet line 5 and controls the closure members 15, 16 or 17 in the distributor tubes 12, 13 or 14. When the temperature of the cooled flow medium drops the closure members are closed stepwise in the sequence described above and when the temperature rises are opened stepwise in the reverse sequence. The connection between the thermostat 20 and closure members 15, 16 and 17 is indicated in FIG. 4 by dashed lines. Details of such a connection are known to one skilled in the air and therefore need not be the subject of further discussion. The described automatic control makes it possible to ensure a constant temperature of the emerging cooled flow medium within the limits defined by the cooling capacity of the cooling tower 1.

Figure 5:
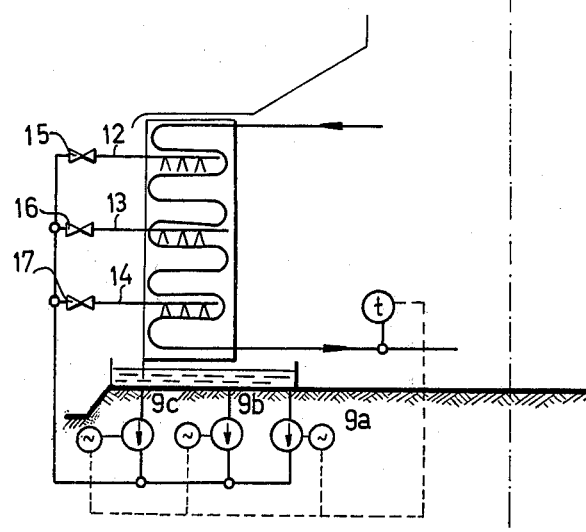
FIG. 5 is yet another embodiment of the present invention in which a plurality of pumps are used to control the pressure of the water supplied to the spray nozzles.

FIG. 5 illustrates a cooling system wherein the water necessary for wetting the outer surface of the cooler 2 is supplied by more than one pump. Three pumps 9a, 9b and 9c are provided. The control of the cooling system is such that all pumps 9a, 9b and 9c must be set in motion for operating all the atomizer nozzles 6. Should the cooling requirement of the cooling tower 1 decrease then pumps 9a, 9b and 9c are switched off in series and in this way the pressure prevaailing in the distributor tubes 12, 13 and 14 is reduced so that the groups of atomizer nozzles 6 are disengaged one after the other in the downwardly aligned sequence.

The hydraulic capacities of the pumps are for this purpose selected so that with simultaneous operation of all pumps all the atomizer nozzles are set into operation while when one or more pumps are taken out of operation the water pressure drops so that the upper atomizer nozzles are switched off according to the number of the operative pumps.

The cooling systems shown in FIGS. 4 and 5 can also be combined. In this case switching the groups of atomizer nozzles 6 on or off is carried out by a common actuation of the closure members 15, 16 or 17 and of pumps 9a, 9b and 9c. It is however also possible to partially close the closure members 15, 16 and 17 and to alter the number of driven pumps 9a, 9b and 9c in order to switch the individual groups of atomizer nozzles 6 on or off or to control the water supply so that the corresponding pressure rises in the atomizer nozzles which continue to operate.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A cooling system for cooling a flow medium, comprising an essentially vertical heat-transfer means adapted for flow of said flow medium therethrough, means for transporting an air current past said heat transfer means, spray nozzles disposed at a plurality of levels and arranged for spraying water onto said heat transfer means, a plurality of valve means, the spray nozzles at each of said levels being associated with one of said valve means for permitting and preventing flow of cooling water therethrough, and a plurality of pumps for pumping the cooling water to the nozzles, the hydraulic capacities of said pumps being such that when all the pumps are operative the resultant water pressure is sufficiently high so that all of the nozzles are supplied with cooling water under pressure whereas when one or more of said pumps is inoperative the water pressure is lowered so that a number of the nozzles proportional to the number of operative pumps are supplied with cooling water under pressure.

2. A cooling system as claimed in claim 1, wherein the uppermost nozzles are lower than the top of said heat-transfer means.

3. A cooling system as claimed in claim 2, wherein the uppermost nozzles are lower than the top of said heat-transfer means by about a quarter of the overall height of the latter.

4. A cooling system as claimed in claim 1 further comprising an outlet line connected to said heat-transfer means, and a thermostat in said outlet line, said thermostat controlling said valve means so that if the flow medium passing through the outlet line from the cooler increases in temperature the valve means open in succession to permit flow of cooling water to the nozzles at successively higher levels and if the flow medium passing through the outlet line from the cooler decreases in temperature the valve means close in succession to prevent flow of cooling water to the nozzles at successively lower levels.

5. A cooling system as defined in claim 1 wherein said means for transporting an air current is a cooling tower.

6. A cooling system as defined in claim 5, wherein said tower is of steel.

7. The cooling system as defined in claim 6, wherein said steel cooling tower is so dimensioned relative to the heat removed by said heat-transfer means that the flow of air therethrough is non-turbulent.

8. A cooling system as claimed in claim 1 wherein said nozzles corresponding to said inoperative pumps are in descending order from the uppermost level downward.

9. A cooling system for cooling a flow medium, comprising an essentially vertical heat-transfer means adapted for flow of said flow medium therethrough, means for transporting an air current past said heat-transfer means, spray nozzles disposed at a plurality of levels and arranged for spraying water onto said heat-transfer means, a plurality of valve means, the spray nozzles at each of said levels being associated with one of said valve means for permitting and preventing flow of cooling water therethrough, and a plurality of pumps connected to said spray nozzles for supplying cooling water thereto and having hydraulic capacity such that when all pumps are in operation all spray nozzles are supplied with water and when one or more pumps are taken out of operation the water pressure produced by said pumps falls sufficiently to take a corresponding number of spray nozzles out of operation, starting from the uppermost level downward.

* * * * *